United States Patent
McCulloch et al.

(10) Patent No.: US 12,210,701 B2
(45) Date of Patent: *Jan. 28, 2025

(54) TOUCH SENSOR SYSTEM CONFIGURATION BASED ON CHARACTERISTICS DETERMINED AS A FUNCTION OF RECEIVED SIGNALS

(71) Applicant: 1004335 ONTARIO INC., Ottawa (CA)

(72) Inventors: Robert Donald McCulloch, Ottawa (CA); Albert M. David, Manotick (CA); Guy Michael Amyon Farquharson Duxbury, Ottawa (CA)

(73) Assignee: 1004335 ONTARIO INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,042

(22) Filed: Sep. 20, 2023

(65) Prior Publication Data
US 2024/0012504 A1 Jan. 11, 2024

Related U.S. Application Data

(63) Continuation of application No. 17/649,900, filed on Feb. 3, 2022, now Pat. No. 11,775,100.
(Continued)

(51) Int. Cl.
*G06F 3/041* (2006.01)
*G06F 3/044* (2006.01)

(52) U.S. Cl.
CPC .......... *G06F 3/0416* (2013.01); *G06F 3/0412* (2013.01); *G06F 3/0446* (2019.05)

(58) Field of Classification Search
CPC .............................. G06F 3/0412; G06F 3/0446
See application file for complete search history.

(56) References Cited

U.S. PATENT DOCUMENTS

| 5,936,615 A | 8/1999 | Waters |
| 7,372,456 B2 | 5/2008 | Mclintock |

(Continued)

FOREIGN PATENT DOCUMENTS

| CN | 101533326 A | 9/2009 |
| EP | 3816776 A1 | 5/2021 |

(Continued)

OTHER PUBLICATIONS

A D Metro "Cyber Security Relating to Touch Technology" A D Metro White Paper, retrieved from (9 pages).
(Continued)

*Primary Examiner* — Liliana Cerullo
(74) *Attorney, Agent, or Firm* — Bookoff McAndrews, PLLC

(57) ABSTRACT

A method for configuring a touch sensor system is provided. The method may be performed automatically by a controller of the system. The system comprises a touch panel operatively coupled to the controller, where the touch panel comprises a plurality of transmit electrodes and a plurality of receive electrodes. The method comprises selectively and individually driving, by the controller, at least one of the transmit electrodes. For each driven transmit electrode, signal outputs from one or more of the receive electrodes are received while the transmit electrode is driven. One or more characteristics of the touch panel is determined as a function of the signal outputs from the receive electrodes. At least one operation setting of the controller is configured based on the one or more characteristics. The one or more characteristics of the touch panel may include a number of transmit electrodes and a number of receive electrodes.

18 Claims, 8 Drawing Sheets

Related U.S. Application Data

(60) Provisional application No. 63/145,789, filed on Feb. 4, 2021.

(56) References Cited

U.S. PATENT DOCUMENTS

| | | | |
|---|---|---|---|
| 9,052,771 | B2 | 6/2015 | Goertz et al. |
| 2007/0074913 | A1 | 4/2007 | Geaghan et al. |
| 2008/0036742 | A1 | 2/2008 | Garmon |
| 2008/0042999 | A1 | 2/2008 | Martin |
| 2008/0117183 | A1 | 5/2008 | Yu et al. |
| 2012/0044188 | A1 | 2/2012 | Prendergast et al. |
| 2012/0287087 | A1 | 11/2012 | Lu et al. |
| 2013/0241874 | A1 | 9/2013 | Long et al. |
| 2014/0168140 | A1 | 6/2014 | Sasselli et al. |
| 2015/0029159 | A1 | 1/2015 | Lyle et al. |
| 2015/0049028 | A1* | 2/2015 | Pollmann ............ G06F 3/14 345/173 |
| 2016/0188181 | A1 | 6/2016 | Smith |
| 2018/0121081 | A1 | 5/2018 | Barsness et al. |
| 2018/0300470 | A1 | 10/2018 | Chih et al. |
| 2021/0096721 | A1 | 4/2021 | Beuker et al. |

FOREIGN PATENT DOCUMENTS

| | | |
|---|---|---|
| GB | 2527918 A | 1/2016 |
| WO | 9624923 A1 | 8/1996 |
| WO | 2009034313 A2 | 3/2009 |

OTHER PUBLICATIONS

Adarsh Verma "This Tiny USB Firewall "USG" Protects You From Hacking Attacks—Here's How to Build It" Fossbytes, Mar. 14, 2017, (7 pages).

Anmol Sachdeva "Armadillo is an Open-Source "USB Firewall" Device to Protect You Against USB Attacks" Fossbytes, Jul. 18, 2019, (8 pages).

Combined Search and Examination Report for UK Patent Application No. GB2201446.8, dated Sep. 9, 2022 (11 pages).

Combined Search and Examination Report for UK Patent Application No. GB2203369.0, dated Oct. 13, 2022 (10 pages).

Steve Kolokowsky et al. "Touchscreens 101: Understanding Touchscreen Technology and Design" Cypress Perform, Jun. 2009, (5 pages).

Zack Whittaker "This USB firewall protects against malicious device attacks" Mar. 9, 2017, (9 pages).

Examination Report for UK Patent Application No. GB2201446.8, dated Jun. 6, 2023 (4 pages).

\* cited by examiner

TOUCH SENSOR SYSTEM CONFIGURATION BASED ON CHARACTERISTICS DETERMINED AS A FUNCTION OF RECEIVED SIGNALS

RELATED APPLICATION(S)

This patent application is a continuation of U.S. application Ser. No. 17/649,900, filed on Feb. 3, 2022, which claims priority to U.S. Provisional Application 63/145,789, filed on Feb. 4, 2021, the entireties of which are incorporated herein by reference.

FIELD OF THE DISCLOSURE

This disclosure relates to touch panel systems including a touch panel and a controller coupled to the touch panel. More particularly, but without limitation, the disclosure relates to controllers configurable for operation with multiple different touch panels.

BACKGROUND

A projected capacitive (PCAP) touch panel system may comprise a touch panel and a controller operatively coupled to the touch panel. The touch panel may be part of a touchscreen, for example, where the touch panel overlays a display. The touch panel typically comprises a two-dimensional criss-cross array of substantially transparent conductive electrodes arranged on a substrate layer (or layers). The electrodes may typically be strips made of indium-tin-oxide (ITO). The strips may define shaped patterns, such as a series of diamond pads, along their lengths and may be arranged in a series of rows and columns. The rows may be separated by a non-conductive layer from the columns. A protective top layer of glass or plastic will typically cover the substrate layer and the conductive strips.

The controller may drive electrodes of the touch panel. Specifically, the controller may output drive signals to a plurality of "transmit electrodes" of the touch panel either collectively or individually. The controller may also measure signal outputs from "receive electrodes" of the touch panel. The received signal outputs (responses) from the touch panel will be a function of capacitance between electrode rows and columns, as the transmit electrodes are capacitively coupled to the receive electrodes. Touches by a finger (or other conductive object) affect the capacitance between adjacent row and column electrodes and their capacitance to ground by diverting coupling electric fields towards the effectively grounded finger. Thus, changes in capacitance of and between rows and columns due to the touches may be detected by monitoring signal output from the electrodes.

Various methods to measure capacitance changes may be utilized. For example, the PCAP touch sensor system's controller may drive each transmit electrode with a series of pulses (e.g. square wave pulses). For a given pair of transmit and receive electrodes (e.g. one row and column), the rates at which the edges of the output signal rise and/or fall may indicate the capacitance through which the pulses travel. These rates may be significantly a function of the shaped features of the electrodes (e.g. diamond pads) and gap between these features of the transmit electrode (e.g. row) and the receive electrode (column) in the region of the intersection of the two electrodes.

In mutual capacitance touch sensor systems, the mutual capacitance between two electrodes (e.g. two perpendicular electrodes) of the touch panel is detected. For example, in a grid of vertical and horizontal electrodes, changes of the mutual capacitances between the horizontal and vertical electrodes are monitored. In a typical two-dimensional electrode grid, each horizontal electrode forms a capacitance with each vertical electrode where they are in close proximity to each other (near their intersection/overlap). Horizontal electrodes of a capacitive touch panel may be referred to as "rows" herein, and vertical electrodes may be referred to as "columns." Touches modify these mutual capacitances, thereby affecting signal outputs from electrodes affected by the touch. The signal outputs are monitored and analyzed to detect the touch(es).

The controller may be configured to individually and selectively drive rows and columns of the touch panel and to receive signal outputs from the rows and columns. The controller may analyze the signal outputs from the rows and columns to determine location of touch events (e.g. fingers or other objects touching the touch panel).

Touch panels may have various different characteristics, such as size, glass top layer thickness, and other. "Size" of the touch panel refers to the number of rows and columns. A controller may be usable with multiple different capacitive touch panels with different sets of characteristics. However, it may be necessary for a manufacturer or purchaser of a traditional touch panel system to manually configure the controller for a given type of touch panel. For example, a controller for a touch sensor system may interface with a host computer system having a display and input device, and a user may use the host computer system to input configuration data corresponding to one or more characteristics of the touch panel (e.g. size) to thereby configure the controller for operation with that particular touch panel. This process may be inconvenient for users and typically requires special software to be installed on the host computer system to allow configuration of the controller. Alternatively, mechanical switches (e.g. DIP switches) that can be set by a user could be provided to allow the controller to be configured based on one or more characteristics of the touch panel currently connected to the controller. However, mechanical switches cannot deliver the highest level of reliability (in particular vibration tolerance) that many applications require. Mechanical switches may also force a repair technician to access the controller board (which may not be easily accessible) when they make a touch panel change.

SUMMARY

According to an aspect, there is provided a method for configuring a touch sensor system comprising a controller and a touch panel operatively coupled to the controller, the touch panel comprising a plurality of transmit electrodes and a plurality of receive electrodes, the method comprising: selectively and individually driving, by the controller, at least one of the transmit electrodes; for each driven transmit electrode, receiving signal outputs from one or more of the receive electrodes while the transmit electrode is driven; determining one or more characteristics of the touch panel as a function of the signal outputs from the receive electrodes; and configuring at least one operation setting of the controller based on the one or more characteristics of the touch panel.

The method may further comprise measuring signal levels of the signal outputs, wherein the determining the one or more characteristics as a function of the signal outputs comprises determining one or more characteristics of the touch panel as a function of the measured signal levels.

In some embodiments, the controller comprises a plurality of transmit lines and a plurality of receive lines, each transmit electrode being coupled to a respective one of the transmit lines, and each receive electrode being coupled to a respective one of the receive lines, and wherein: the driving the at least one of the transmit electrodes comprises sequentially driving at least one of the plurality of transmit lines by the controller.

In some embodiments, the one or more characteristics of the touch panel comprises a number of transmit electrodes and a number of receive electrodes of the touch panel.

In some embodiments, the plurality of transmit electrodes is arranged as one of rows and columns, and the plurality of receive electrodes is arranged as the other of rows and columns.

In some embodiments, the configuring the at least one operation setting comprises configuring the controller for operation with the determined number of the transmit electrodes and the determined number of the receive electrodes.

In some embodiments, the one or more characteristics of the touch panel comprises a touch panel type.

In some embodiments, the at least one operation setting comprises a sensitivity setting selected as a function of the touch panel type.

The method may further comprise: receiving further signal outputs from the touch panel during one or more touches of the touch panel; determining one or more additional characteristics of the touch sensor as a function of the received further signal outputs; and configuring an additional operation setting based on the determined one or more additional characteristics.

The method may further comprise: receiving further signal outputs from the touch panel during one or more touches of the touch panel; and analyzing the received further signal outputs and adjusting a sensitivity setting as a function of the analyzing.

According to another aspect, there is provided controller for a touch panel comprising a plurality of transmit electrodes and a plurality of receive electrodes, the controller comprising: control circuitry that: selectively and individually drives at least one of the transmit electrodes of the touch panel; and for each driven transmit electrode, receives signal outputs from one or more of the receive electrodes of the touch panel while the transmit electrode is driven; and generates touch sensor data as a function of the received signal outputs; configuration circuitry that: receives the touch sensor data from the control circuitry; determines one or more characteristics of the touch panel as a function of the touch sensor data; and configures at least one operation setting of the controller based on the one or more characteristics of the touch panel.

In some embodiments, the control circuitry measures signal levels of the signal outputs, wherein the determining one or more characteristics of the touch panel as a function of the signal outputs comprises determining the one or more characteristics as a function of the measured signal levels.

In some embodiments, the control circuitry comprises a plurality of transmit lines and a plurality of receive lines, each transmit electrode being coupled to a respective one of the transmit lines, and each receive electrode being coupled to a respective one of the receive lines, and wherein: the driving the at least one of the transmit electrodes comprises sequentially driving at least one of the plurality of transmit lines by the controller.

In some embodiments, the one or more characteristics of the touch panel comprises a number of transmit electrodes and a number of receive electrodes.

In some embodiments, the plurality of transmit electrodes is arranged as one of rows and columns, and the plurality of receive electrodes is arranged as the other of rows and columns, and configuring the at least one operation setting comprises configuring the controller for operation with the determined number of the transmit electrodes and the determined number of the receive electrodes.

In some embodiments, the one or more characteristics of the touch panel comprises a sensitivity characteristic.

The controller may further comprise: a control chip, the control chip including the control circuitry; and a configuration chip, the configuration chip including the configuration circuitry.

In some embodiments, the configuration circuitry comprises a first interface coupled to the configuration chip for communication with a host computer, and a second interfaced coupled between the configuration chip and the control chip for communication between the configuration chip and the control chip.

In some embodiments, the first interface comprises a first USB interface.

In some embodiments, the second interface comprises a second USB interface.

According to another aspect, there is provided a touch sensor system comprising a controller as described herein; and a touch panel coupled to the controller.

BRIEF DESCRIPTION OF THE DRAWINGS

The present disclosure will be better understood having regard to the drawings in which.

DETAILED DESCRIPTION

Figure 1:
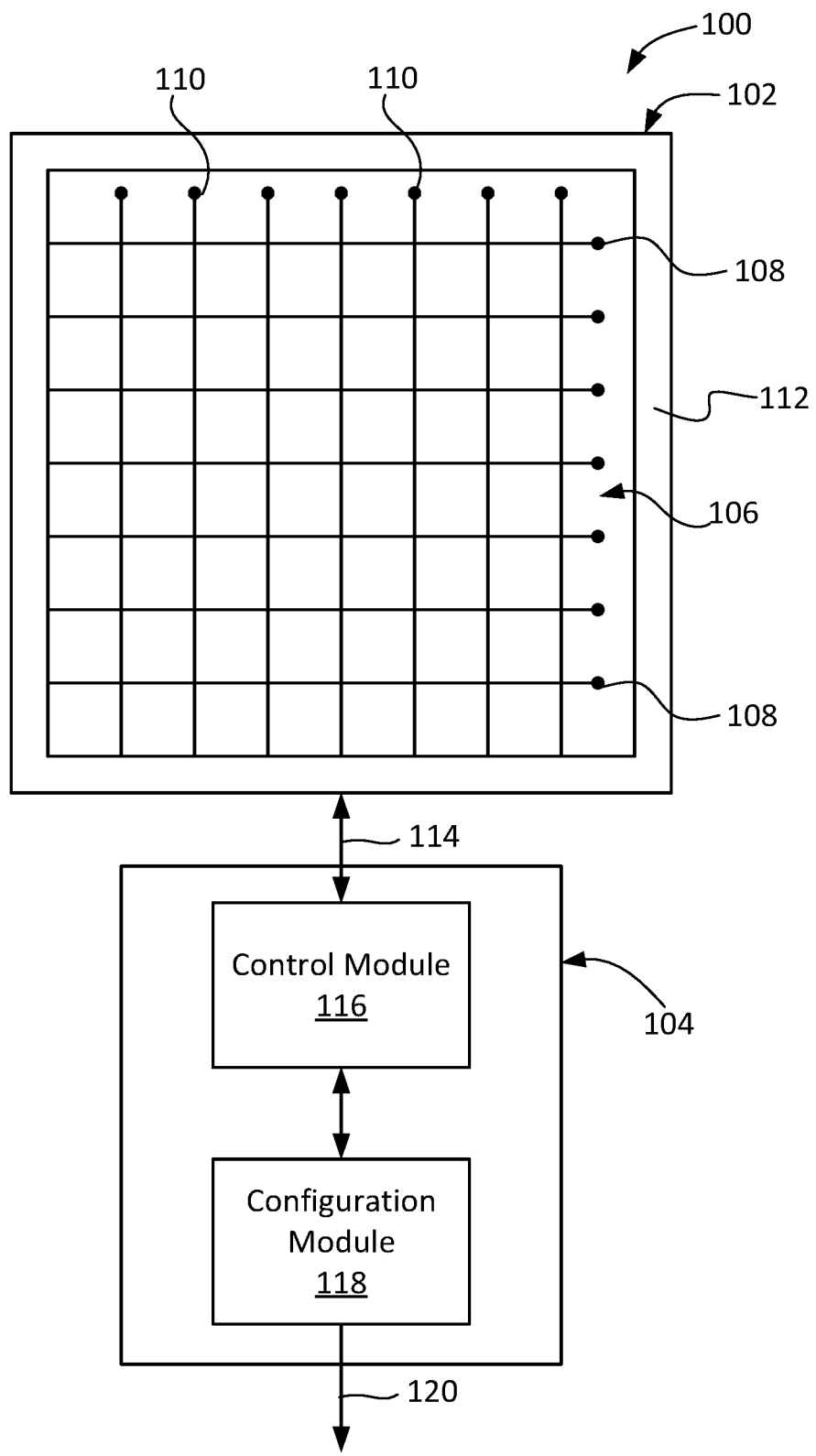
FIG. 1 is a block diagram of an example touch sensor system according to some embodiments, including a controller and a touch panel.

A touch sensor system may include a touch panel and a controller that connects to the touch panel. The controller may receive and process output from the touch panel. Aspects of the disclosure provide a controller for a capacitive touch panel. The controller may be configured to automatically detect one or more characteristics of a touch panel to which the controller is connected. The term "controller" may refer to any combination of hardware and software (e.g. circuitry) capable of driving the touch panel and processing output from the touch panel to generate touch data. The controller may be configured to work with a multiple different touch panel types (i.e. touch panels having differing characteristics or combinations of characteristics). Upon detecting one or more characteristics of the touch panel to which the controller is currently connected, the controller may set one or more operation settings as a function of the one or more detected characteristics. The one or more detected characteristics may include a size (i.e. number of rows and columns) of the touch panel. The controller may, thus, be referred to as a "size adaptive" controller.

In some embodiments, the controller is operatively connected to the touch panel by a plurality of electrical connections, such as a bus comprising a plurality of wires. Some of the wires may be coupled to drive the "transmit" electrodes, and some of the wires may be coupled to the "receive" electrodes. This wired connection may be in the form of a "flex tail" connector. Touch panels of multiple sizes and configurations may support the same flex tail connector type (with the same number of wires in the connector). That way, multiple different touch panel types may more easily be swapped out and used with the same controller without necessitating different flex tail connectors. In such cases, depending on the size of the touch panel, one or more wires, even several wires, of the flex tail may be unused in that they are not coupled to any electrodes of the touch panel.

In some embodiments, flex tail adaptors may be provided to adapt the flex tail for use with various touch panel types. Potentially, various adaptors could be coupled to the flex tail so that touch panels of various sizes or wiring configurations could be used with the controller, provided the touch panel does not have more electrodes (wire connections) than the maximum supported by the controller.

In some systems, at least a portion of electronics of a controller may be contained in the flex tail, which may be attached to the touch panel. In such systems, the touch panel and/or flex tail may still be interchangeable.

The touch panels described herein may be capacitive touch panels, such as Projected Capacitive (PCAP) touch panels. However, embodiments are not limited to capacitive touch panels. Other types of panels having rows and columns of sensor elements may also be used. For example, aspects of the disclosure may also be applied to optical touch panels or resistive touch panels that use a matrix of rows and columns as a means of achieving multiple touch detection.

FIG. 1 is a block diagram of a capacitive touch sensor system 100. The system 100 includes an example touch panel 102 and a controller 104. The touch panel 102 is a PCAP touch panel in this embodiment. The controller 104 may be used with various different capacitive touch panel configurations, as will be discussed below, and the specific touch panel 102 is shown by way of non-limiting example. The touch panel 102 includes sensor area 106 formed by a planar substrate having a plurality of horizontal electrode channels (i.e., "rows" 108) and a plurality of vertical electrode channels (i.e., "columns" 110) arranged thereon. The number and spacing of the rows 108 and columns 110 may vary. The number of the rows 108 and columns 110 may be referred to herein as the "size" of the touch panel 102. Spacing between the rows 108 and columns 110 corresponds to a "pitch" of the touch panel 102. The actual physical space of the sensing area 106 of the touch panel 102 will be a function of the "size" (i.e. numbers of rows/columns) and "pitch" (or resolution). A portion of the touch panel 102 corresponding to a cross over of a row 108 and column 110 may be referred to herein as a "cell".

The rows 108 and columns 110 may, for example be connected to various circuitry (not shown) within a bezel 112 that typically extends around a periphery of the sensor area 106. In other embodiments, another touch panel may not include a bezel or only have a small bezel, and at least some circuitry of the touch panel may instead be located behind the substrate or elsewhere.

The controller 104 is operatively connected to the touch panel 102 by a bus 114, which may comprise a plurality of wires, such as a flex tail connector. More specifically, the controller 104 in this example comprises a control module 116 and a configuration module 118 operatively connected to the control module 116. The control module 116 comprises a plurality of transmit lines 204 (shown in FIG. 2) connected, via the bus 114, to a first plurality of electrodes of the touch panel 102. The control module 116 also comprises a plurality of receive lines 206 (shown in FIG. 2) connected, via the bus 114, to a second plurality electrodes of the touch panel 102.

The term "transmit line" refers to any electrical output component of a circuit for outputting drive signals to the touch panel 102. Drive signals are analog reference signals input to the transmit electrodes of the touch panel 102. The transmit lines 204 of the control module 116 may comprise output pins (in the case of a chip), or any other electrical output connection, node, or terminal to name a few examples. The term "receive line" refers to any electrical input component of a circuit for receiving input. The receive lines 206 may comprise input pins (in the case of a control chip), or any other electrical input connection, node, or terminal to name a few examples.

The term "module" may refer to any circuitry configured for performing the various functions described herein. The circuitry may include at least one processor and may include memory having processor-executable instructions stored thereon for performing, implementing, or controlling functions described herein. Two or more modules may share at least some circuitry. For example, a processor may implement multiple modules in some embodiments. The circuitry may comprise any combination of hardware and/or software in memory executed by the hardware that implements the module functionality described herein.

For ease of description, the first plurality of electrodes may be referred to herein as "transmit electrodes" and the second plurality of electrodes may be referred to as "receive electrodes." The term "transmit electrodes" refers herein to electrodes (either rows 108 or columns 110 in this example) of the touch panel 102 that are driven by the controller 104. The term "receive electrodes" (either rows 108 or columns 110 in this example) are the electrodes of the touch panel 102 that output signals to the controller 104, which are received as input by the control module 116. The transmit electrodes may be the rows 108 and the receive electrodes may be the columns 110, or vice versa. In some embodiments, the electrodes may usable as either transmit or receive electrodes depending on whether they are coupled to transmit lines 204 or receive lines 206. The electrodes may not be configured for only transmit operation or only receive operation for all cases.

The bus 114 interconnects the control module 116 and the touch panel 102. The bus 114 may comprise a respective individual wire connection for each of the rows 108 and columns 110, such that each row 108 and each column 110 has a respective connection to a respective transmit line 204 (FIG. 2) or a respective receive line 204 (FIG. 2) of the control module 116. Each transmit line 204 may be a transmit pin of a chip and each receive line 206 may be a receive pin of the chip. The control module 116 may thus individually and selectively drive electrodes of the rows/columns connected to transmit lines 204 and receive output from the rows/columns connected to receive lines 206. In this example, each of the rows 108 of the touch panel 102 may be connected to a respective transmit line 204 of the control module 116, and each of the columns 110 may be connected to a respective receive line 206 of the control module 116 (or vice versa). Thus, the transmit lines 204 may drive the rows 108, and the receive lines 206 may measure outputs from the columns 110. A reversed configuration of rows and columns may be used in other embodiments.

Figure 2:
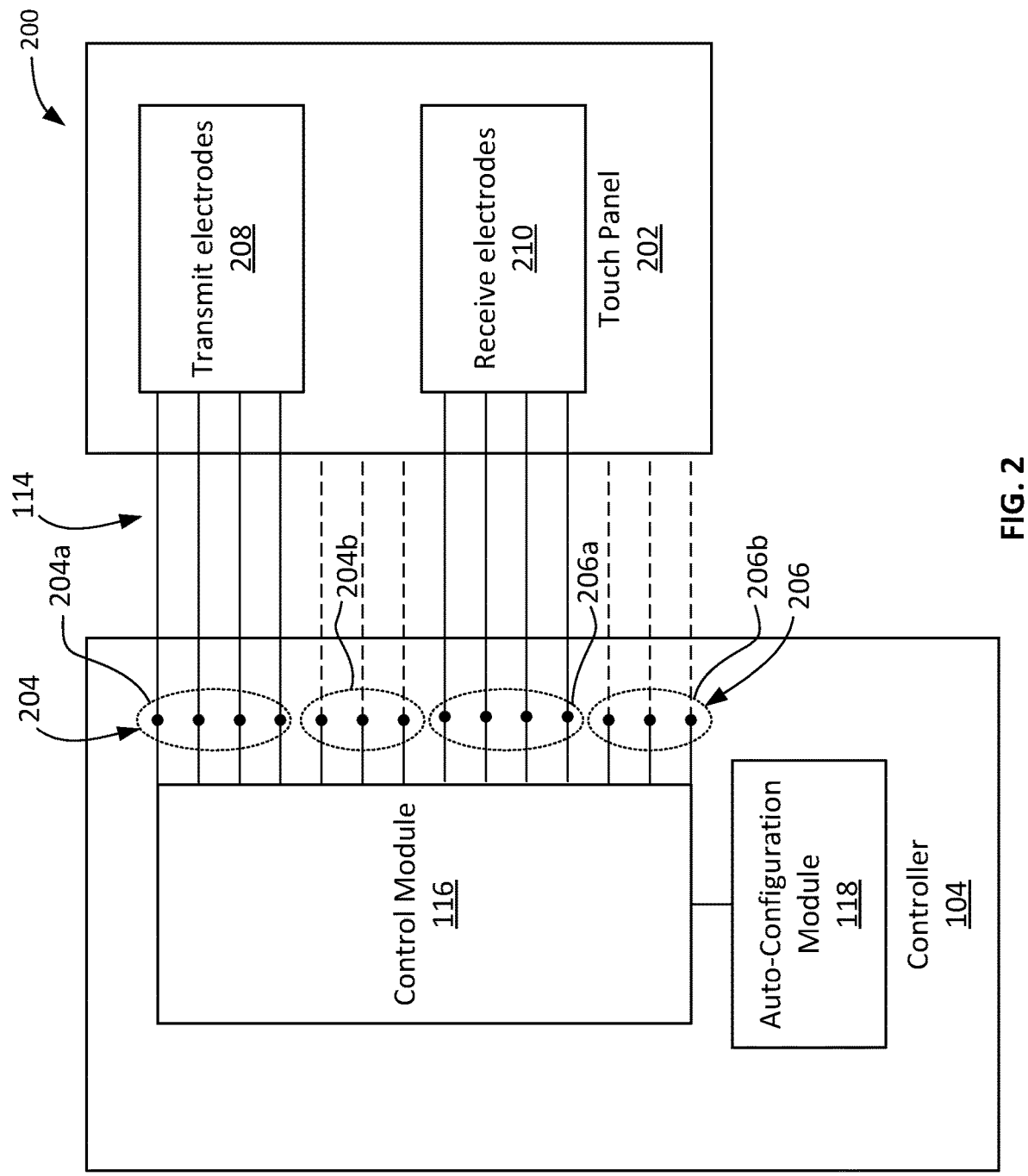
FIG. 2 is a block diagram of another example touch sensor system including the controller of FIG. 1 coupled to a different touch panel.

FIG. 2 is a block diagram of another touch sensor system 200 including the controller 104 of FIG. 1 connected to a different touch panel 202. The transmit electrodes are collectively represented by block 208 and the receive electrodes are collectively represented by block 210. In this diagram, the transmit lines 204 and the receive lines 206 are shown. The specific number of transmit lines 204 and receive lines 206 may vary, and the number shown in FIG. 2 is simply for illustrative purposes.

A first subset of transmit lines 204*a* may be coupled to the plurality transmit electrodes 208 of the touch panel 202. These transmit electrodes 208 may be arranged as rows (similar to rows 108 in FIG. 1) for example. A first subset of receive lines 206*a* may be coupled to a plurality of receive electrodes 210 of the touch panel 202. These receive electrodes 210 may be arranged as columns (similar to columns 110 in FIG. 1) for example. The number of transmit lines 204 of the control module 116 may be greater than the number of transmit electrodes 208, such that a second subset of transmit lines 204*b* are not operatively coupled to any electrodes of the touch panel 202, as represented by dashed lines representing wires of the bus 114 not coupled to electrodes. Similarly, a second subset of receive lines 206*b* are not operatively coupled to any electrodes of the touch panel 202, as represented by dashed lines representing wires of the bus 114 not coupled to electrodes. The control module 116 (e.g. PCAP control chip) may have a sufficiently large number of transmit and receive lines so that the control module 116 can be configured to work with a variety of desired touch panel sizes.

With reference to FIG. 2, the control module 116 may drive the transmit electrodes 208 of the touch panel 202 and receive signal outputs from the receive electrodes 210. The configuration module 118 may receive, as input, touch sensor data output from the control module 116. The touch sensor data may include measured signal levels of the signals received from the touch panel 202. The configuration module 118 may analyze the output from the control module 116 to determine one or more characteristics of the touch panel 202 as a function of the touch panel data. The configuration module 118 may also configure one or more operation settings of the controller 104 as a function of the determined one or more characteristics. For example, the one or more characteristics may comprise a size of the touch panel 202, and the controller 104 may thereby be automatically configured to operate for the determined size of the touch panel 202.

The term "signal levels" may refer to voltage levels of signals (e.g. pulses) or changes in voltage levels of the signals received from the touch panel receive electrodes. However, the "signal levels" may refer to other signal characteristics indicative of touch (or extent of touch) such as slope or changes in slope. For example, where the drive signals are short pulses, the control module 116 may measure changes in slopes of edges of pulses output from the receive electrodes. The changes in slopes may be converted to digital touch sensor data.

The control module 116 may be in the form of a PCAP control chip, for example. The PCAP control chip may, in some embodiments, be a commercially available control chip in some embodiments. The configuration module 118 may be implemented by circuitry separate from the control module 116. For example, the configuration module 118 may be implanted on a separate chip with a microcontroller. The configuration module 118 is intermediate the control module 116 and an output 120 of the controller 104. In other embodiments, a single physical integrated circuit chip may include both the control module 116 and the configuration module 118. The control module 116 and the configuration module 118 may otherwise share hardware such as a processor and/or memory.

Different touch panels may be couplable to the controller 104 using a same form of bus 114, with the bus 114 containing the same number of wires. In other words, multiple different types of touch panels may support the same format of bus 114. This may allow users to plug any one of a plurality of supported touch panel types into the same controller 104. The same control module 116 may be configured (e.g. programmed) for different sizes and for different other characteristics of the touch panel (e.g. touch panel 102 or 202). The control module 116 may also be customized for user preferences. Common customer preferences may include but are not limited to: panel orientation (e.g. landscape or portrait or the upside-down versions of each of these); panel sensitivity; number of touches supported and touch activation (whether the touch is reported upon contact or release of a touch).

As noted above, the configuration module 118 may automatically determine one or more characteristics of the touch panel (e.g. touch panel 102 or 202). This process may be performed on start-up of the controller 104, when the controller 104 detects that a new touch panel has been connected, or upon receipt of corresponding user input (e.g. pressing a button on the controller 104) to name a few examples. These characteristics may include size, pitch, panel substrate or top layer glass details (e.g. thickness of a glass top layer on the touch panel), and/or other characteristics. All of these panel characteristics (and others) may affect output from the control module 116.

Figure 3:
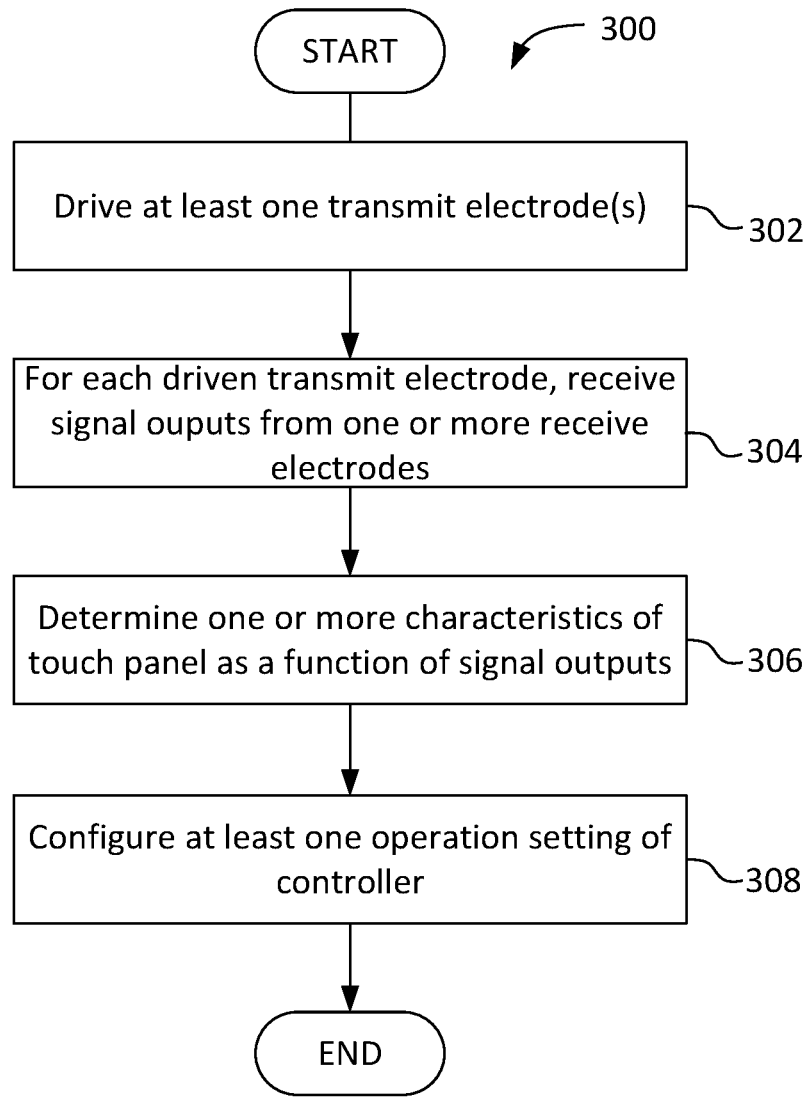
FIG. 3 is a flowchart of an example method for configuring a controller for a touch sensor panel according to some embodiments.

FIG. 3 is a flow chart of an example method 300 for determining one or more characteristics of a touch panel (e.g. touch panel 102 or 202). The method 300 will be described as being performed by the controller 104 of FIGS. 1 and 2. In some embodiments, the method 300 is implemented or controlled by the configuration module 118. However, the method 300 is not limited to the particular controller 104 shown and may be performed by other controllers.

At block 302, the controller 104 selectively and individually drives at least one transmit electrode of the touch panel. The control module 116 may sequentially drive at least the transmit line(s) 204 coupled to the at least one transmit electrode. The configuration module 118 may direct the control module 116 to drive the at least one transmit electrode.

At block 304, for each driven transmit electrode, the controller 104 receives signal outputs from one or more of the receive electrodes of the touch panel while the transmit electrode is driven. More particularly, the control module 116 may, for each driven transmit panel, receive signal outputs from one or more receive line(s) 206 coupled to the at least one receive electrode. In this way, various combinations of transmit and receive electrodes may be measured. Each unique combination of transmit and receive electrode (i.e. row and column crossover) may correspond to a "cell" of the touch panel.

At block 306, the controller 104 determines one or more characteristics of the touch panel as a function of the signal outputs. For example, the control module 116 may make measurements of the signal outputs received form the touch panel and generate touch panel data as a function of the measurements. The touch sensor data may, for example, comprise measured signal levels of the signal outputs. The configuration module 118 may receive the touch sensor data from the control module 116. To determine one or more characteristics of the touch panel, the configuration module 118 may analyze the measured signal levels. The measured signal levels may, for example, provide an indication of the number of transmit electrodes and receive electrodes.

At block 308, an operation setting of the controller 104 is configured based on the one or more characteristics of the touch panel.

Figure 4:
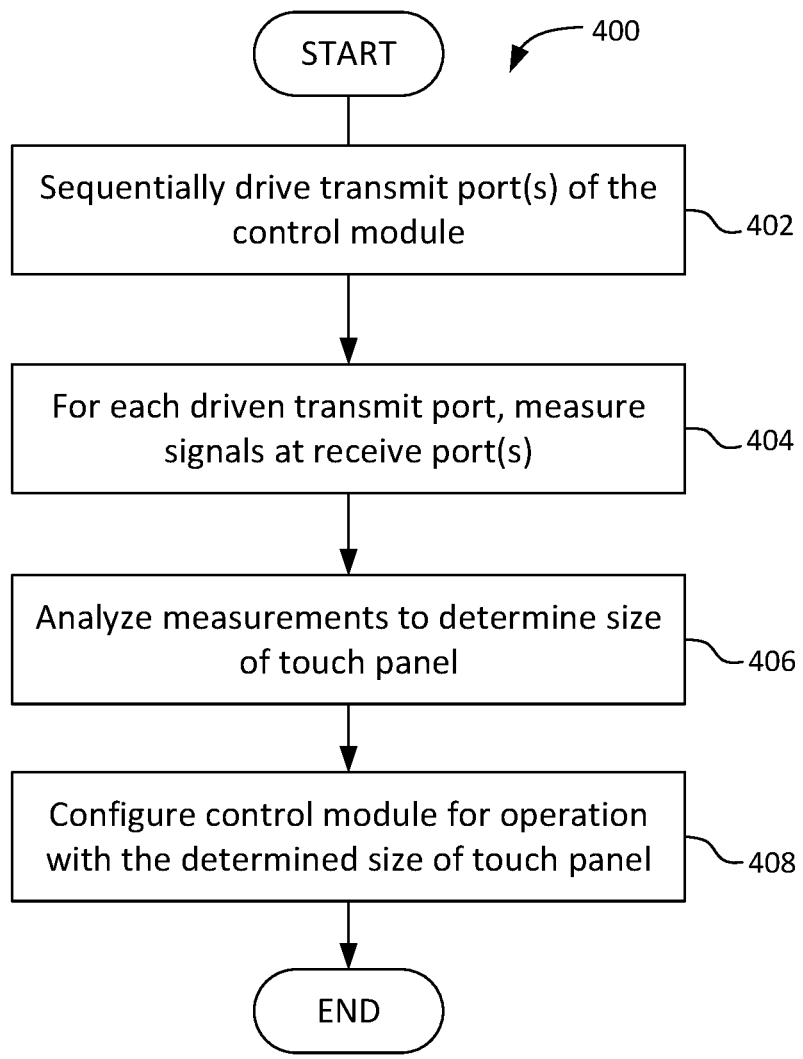
FIG. 4 is a flowchart of another example method for configuring a controller for a touch panel according to some embodiments.

FIG. 4 is a flow chart of a more specific example method 400 for automatically determining a size of a touch panel (e.g. touch panel 102 or 202) according to some embodiments. The method 400 will be described as being performed by the controller 104 of FIGS. 1 and 2. In some embodiments, the method 400 is implemented or controlled by the configuration module 118. However, the method 400 is not limited to the particular controller 104 shown and may be performed by other controllers. The method 400 may be performed to determine the number of rows 108 and columns 110 in the touch panel 102 or the number of transmit electrodes 208 and receive electrodes 210 of the touch panel 202 of FIG. 2.

At block 402, each of the transmit lines 204 (e.g. transmit pins) of the control module 116 are sequentially driven. This may include driving the transmit electrodes of the touch panel (e.g. touch panel 102 or 202) as well as extra transmit lines 204 not connected to transmit electrodes. For example, the configuration module 118 may send control signalling to the control module 116 to sequentially drive each of its transmit lines 204. In other embodiments, only a subset of the transmit lines 204 may be driven. It may not be necessary to drive all transmit lines 204 (or all transmit electrodes) to identify edges of the transmit electrodes. The term "edge" here refers to the first or last transmit electrode in a series of rows or columns.

At block 404, for each driven transmit line 204, signal measurements for the receive lines 206 are taken. For example, the configuration module 118 may control the control module 116 to take measurements using all its receive lines 206 (e.g. receive pins) for each driven transmit line 204. The control module 116 may thereby report a measured signal for each cell (row/column combination) of the touch panel. The measured signal for each cell may be reported to the configuration module 118. In some embodiments, for each sequentially driven transmit line 204, outputs of all of the receive lines 206 may be measured. In other embodiments, only a subset of the receive lines 206 may have their outputs measured. It may not be necessary to receive signals at all receive lines 206 (or all transmit electrodes) to identify edges of the receive electrodes. The term "edge" here refers to the first or last receive electrode in a series of rows or columns.

At block 406, the configuration module 118 analyzes the measurements for each cell to determine a number of rows (e.g. rows 108 of FIG. 1) and a number of columns (e.g. columns 110 of FIG. 1). This analysis may comprise comparing the measured signal for each cell. For example, transmit lines that are not connected to any transmit electrode may not result in any significant measured output or change in output for any receive line. Similarly, receive lines that are not connected to any receive electrode may not generate any significant response or output change regardless of driven transmit electrodes. However, when a transmit line that is connected to a respective transmit electrode is driven, the driven transmit electrode may generate a change in measured output (compared to the non-driven state) for each receive electrode that crosses the transmit electrode. Thus, the number of transmit and receive electrodes (and thereby the number of rows and columns) may be determined by analyzing the signal level measurements.

Optionally, at block 408, upon determining the size of the touch panel 102, the configuration module 118 may configure the control module 116 (and/or other controller circuitry) for operation with the determined size of the touch panel. This configuring may comprise outputting an operation setting output to the control module 116, where the operation setting output updates or changes an operation setting of the control module 116.

Some capacitive touch panel control chips may have dual-function pins configurable to function as either transmit or receive pins. In such cases, the method may comprise, as a first test, causing the control chip to configure all dual-function pins as transmit pins, and then performing the functions of blocks 402 to 406. The configuration module 118 may receive and analyze signals that relate to the amount of transmitted capacitive signal that is acquired by each receive pin, for each combination of transmitter and receiver. The signals received from the first test may reveal two possible cases: a) the combination of transmit pin and receive pin have no (or no significant) electrical interconnection via the rows and columns of the transparent conductive grid of the touch panel and b) the combination of transmit and receive pin are linked by a small capacitance bridge between an overlapping row and column of the transparent conductive grid of the touch panel. The configuration module 118 may assess the signal levels acquired for each row/column combination and determines panel 'size' (numbers of rows and columns of the transparent conductors in the panel). In many cases, this first test may clearly indicate the number of electrode rows and columns. In other embodiments, dual-function pins may instead first be configured as receive pins rather than transmit pins.

In some cases where touch panels have many rows and columns, there may be ambiguity about how some dual-function control chip pins need to be configured. The first test described above may reveal this potential situation when/because receive pins adjacent to dual-function pins (configured in the first test as transmit pins) are found to be connected to conductors of the touch panel. In these cases, a second test (and in rare cases a further test or tests) may be necessary. In the second test, if the dual-function pins were first configured as transmit pins, some or all of those dual-function pins are re-configured as receive pins (and fewer as transmit pins). Blocks 402 to 406 of the method 400 may then be repeated. Test iterations may be performed until no additional touch panel rows or columns can be found and the panel 'size' has been determined.

Alternative methods may also be used to determine touch panel size, and embodiments are not limited to the method 400 of FIG. 4. As one example, extra or unused wires of a flex tail connection (or other wired bus connection) maybe grounded by connections to ground either in the touch panel or in the flex tail connection itself. In some embodiments, the extra or unused wires may also be connected to each other in a pattern. This pattern connection may, for example, be accomplished in the touch panel using printed conductive ink on a structure of the panel, much like the conductive ink that is typically already used to connect PCAP touch panel rows and columns to flex tail conductors.

The controller 104 could be configured to test the wire connections of the flex tail (or other connector) to identify which (if any) wires are directly or nearly directly connected to one another or ground. The pattern of which wires are connected together may effectively create an "identification code" that indicates a size of the touch panel, or other touch panel characteristics. The characteristics may include, without limitation, size, pitch, variables related to electrode pattern (e.g. diamond shaped pad) geometry details, substrate material, ITO characteristics for example. A lookup table of identification codes may be provided within controller firmware, for example. This method may be implemented with a few extra/unused wires in the flex tail connector. The "in-use" flex tail wires could be distinguished by the "identifying code" reading electronics without modifying typical PCAP design because these lines are DC open circuits because the "intersecting" panel row and column electrodes are separated by gaps. In some embodiments, the flex tail could include a set of extra "identification" wires set aside or dedicated for this purpose that are not connected directly to electrodes of the touch panels of any size. If eight identification wires are provided, potentially five thousand or more unique identification codes could be generated using those eight wires. The number of available identification codes could be increased by allowing unconnected, grounded and multiply interconnected identification wires.

The interconnections between the identification wires could occur on the flex tail (or other wired connection between the controller and touch panel), the touch panel substrate (which may already contain conductive traces) or a combination of the two. Having the interconnections positioned on the touch panel substrate may be beneficial where part of the code relating to the panel substrate is "encoded" on the substrate, and part of the code relating to follow-on aspects of panel manufacturing is "encoded" in the flex tail (e.g. top layer glass material, top layer glass thickness) and possibly even target customer configuration (e.g. orientation, sensitivity/gain, maximum number of touches, activation on contact or release). For example, a manufacturer could encode first information about the touch panel (on the touch panel) when that component is manufactured, further encode second information about the completed touch panel (e.g. including the flex tail) when that complete touch panel is assembled. Third information, such as panel usage information, could be further encoded. For example, the third information may be encoded before shipment once the customer has communicated their intended usage (or the customer could control the latter step or steps).

For encoding an identifying code on a touch panel substrate, a conductive ink (e.g. silver ink) may be deposited in a pattern on the substrate to create codes. The ink could similarly be originally manufactured in one way and 'edited' (e.g. just before the substrate is assembled into a panel) by making or breaking some or all of these electrical connections.

For encoding an identifying code in the flex tail, a variety of different flex tail designs may be implemented with different connections of the identification wires encoding identifying codes or elements of identifying codes. The identifying code may optionally be "written" at the time of manufacture or installation. This may be accomplished by making the conductive wires in the flex tail with traces and/or pads that are accessible, and cutting the traces or connecting the pads. The "writing" of the identifying codes may also include removing or adding conductive components or materials (solder connections and/or small resistors for example).

As discussed herein, the configuration module 118 of the controller 104 may be capable of determining other characteristics in addition to panel size. For example, the configuration module 118 may analyze signals received from the control module 116 to distinguish panels based on top layer glass thickness. The configuration module 118 may configure the control module 116 to adjust the gain/sensitivity with one touch panel compared to another other. The configuration module 118 may not need to determine actual top layer glass thickness. Rather, differences in signal strength or other signal characteristics in the signals received from the control module 116 may be recognized. For two panels of the same size, it may be known that a panel with a first top layer glass thickness tends to generate output signals having more or less average strength than another panel of the same size having another glass thickness. For example, once panel size is known, the control module 116 may makes additional calculations based on the received signals to distinguish the panel of that size from other panels of the same size.

Figure 5:
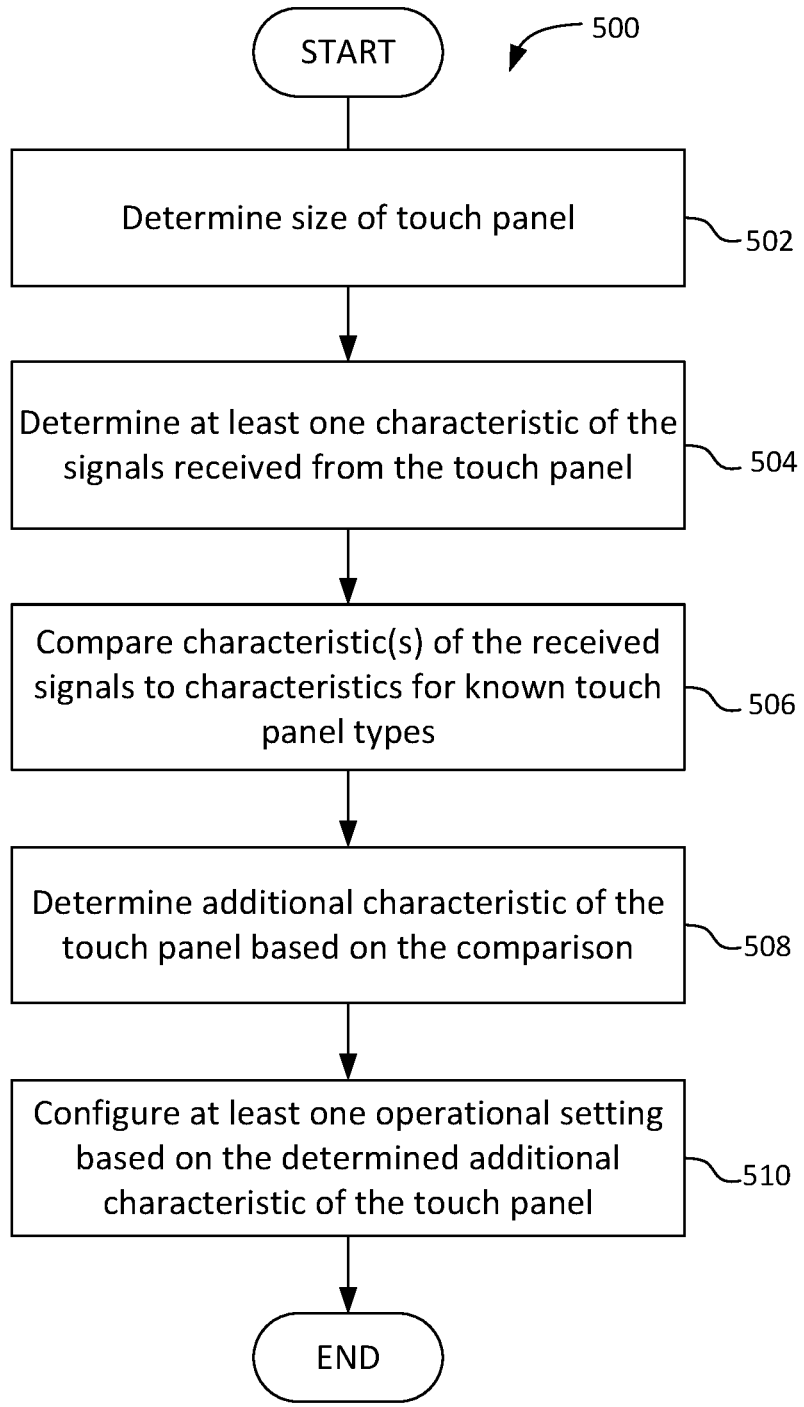
FIG. 5 is a flowchart of another example method for configuring a controller for a touch panel according to some embodiments.

FIG. 5 is a flowchart of another example method 500 that may be performed by a controller of a touch sensor system, such as the system 100 or 200 of FIGS. 1 and 2. The method 500 will be described as being performed by the controller 104 of FIGS. 1 and 2. In some embodiments, the method 500 is implemented or controlled by the configuration module 118. However, the method 500 is not limited to the particular controller 104 shown and may be performed by other controllers.

At block 502, the configuration module 118 optionally determines a size of the touch panel (e.g. touch panel 102 or 202 of FIGS. 1 and 2). This method may comprise the steps of the method of FIG. 4, for example, although embodiments are not limited to only the method of FIG. 4. In some embodiments, block 502 may be omitted.

At block 504, the configuration module 118 determines at least one property of the signal outputs received from the touch panel. The at least one property of the signals may include, but are not limited to, average or median signal strength, and/or signal levels corresponding to one or more electrodes or one or more cells. The configuration module 118 may receive touch panel data from the control module 116 and analyze that data to determine the at least one property of the signal outputs received from the touch panel.

At block 506, the at least one property of the received signal outputs from the touch panel is compared to expected signal properties for known touch panel types. As explained below, the controller 104 may store a set of "expected" signal properties, such as a set of expected average signal strengths, for a plurality of known touch panel types. These known or "expected" properties may be compared to the observed signal property. The controller 104 may store a database (e.g. "library") including the expected properties for known touch panel types.

As another example, some touch panels may have somewhat different signal levels on row edge (and/or near edge) and/or column edge (and/or near edge) and/or various corners, in comparison to the signal levels of typical cells that are not near edges. Such behaviors may allow even more nuanced distinctions in identifying attached PCAP panels. Signal level responses for all or a subset of cells, rows, and/or columns of a touch panel may form a type of recognizable "fingerprint" that corresponds to a particular model of touch panel. That is, touch panels of a particular type (e.g. a model from a manufacturer) may all share common signal level "fingerprint" that can be recognized by the configuration module 118. Characteristic features of the fingerprint may tend to occur near edges of the touch panel electrode grid. For example, for a given touch panel type, a particular end row or column may be known to have an elevated (or reduced) signal output compared to other columns, and this feature may assist in identifying the touch panel type. Signal gradients or other observable properties may also be characteristic of particular models and may be used to identify touch panel of those models.

At block 508, the additional characteristic of the touch panel is determined based on the comparison of block 506. For example, if the determined property of the signal matches, or is within a threshold of a given expected signal for a given type of touch panel, then the configuration module may determine that the currently connected touch panel is of that type. The touch panel type (or model) cataloged in the database that best matches the at least one property of the signal outputs determined at block 506 may be selected, meaning that the controller 104 determines that the currently connected touch panel is that selected type.

The additional characteristic may be a "sensitivity characteristic," which refers to any characteristic of the touch panel that affects or contributes to an optimal sensitivity setting for the touch panel. For example, sensitivity characteristics may be a physical characteristic of the touch panel such as a type of cover (e.g., material and/or thickness), a pre-determined or default sensitivity level corresponding to that type of touch panel, or any other characteristic that may be used in a decision to raise or lower sensitivity of the touch panel. The pre-determined or default sensitivity level may be stored in the database of information for known touch panel types.

At block 510, the configuration module 118 may configure at least one operation setting of the controller 104 as a function of the determined additional characteristic of the touch panel. The configuration module 118 may configure the operation settings to be appropriate for the determined panel type. For example, the sensitivity of the controller 104 may be adjusted based on the determined type of top layer.

The controller 104 may include memory storing a database or "library" of information for known panel types and criteria associated with those panel types. In some embodiments, such information may be retrieved from an online source or other remote source. The criteria for each panel type may correspond to expected properties of the signals received from the control module 116 (e.g. average signal strength, etc.). These expected properties may be based on empirical testing, for example. The configuration module 118 may compare received signalling to the pre-stored criteria to distinguish between the known touch panel types and thus apply the most suitable configuration for that panel type. The memory storing the database of information about known panel types may be a 'permanent' memory in that it is not lost when the controller 104 is powered down. Data for additional encountered panels may be added to the database. This memory may also store other information including, but not limited to original factory configuration and operation settings most selected by a user (e.g. most recent user-configured settings or multiple sets of previous user-configured settings). The 'previously selected' operation settings for a given panel may be automatically applied when that touch panel is connected to the controller 104 and the panel is automatically identified by the controller 104. Operation setting may include, but are not limited to, gain/sensitivity, 'maximum number of touches' (beyond which the touch sensor system ignores and doesn't report via USB) and/or orientation of the touch panel (i.e. which corner of the touch panel is the origin of reported (X, Y) touch coordinates).

Once the controller 104 has a database of "known" touch panel types and associated touch panel operation settings, the controller 104 may easily recognize a panel from the database and automatically set up the associated settings for that panel. By way of example, a first touch panel may be known to the controller 104 and have a first set of characteristics. The first set of characteristics could, for example, be: 10" panel with thick glass (as opposed to an available thin glass version); installed with a certain orientation; and/or a row/column wiring arrangement that is opposite to other known panels. If the first touch panel is replaced with a second touch panel of a type already "known" to the controller 104 (i.e. has panel characteristics and associated operation settings stored in the database), then controller 104 may detect that panel type and automatically apply the associated settings. In this way, the database stored in the controller 104 may obviate the need for a touch panel manufacturer or user to change product firmware/software or modify equipment hardware (e.g. wiring design) to set the orientation or gain/sensitivity.

The touch panel auto-characterization and configuration process may require a few seconds in some embodiments. The process may be triggered on start-up. However, it may be impractical in some scenarios to execute the process every time the controller 104 is powered up (or a touch panel is plugged in), though embodiments are not limited to a particular trigger condition. In some embodiments, the controller 104 may attempt to characterize a touch panel if the controller 104 detects touch panel disconnection and a new touch panel has been connected to the controller 104. The process may optionally be triggered by user input (e.g. button) on the controller 104. For example, input provided as the controller 104 powers up may trigger the process.

Touches on the touch panel may affect the test measurements being performed by the configuration module 118 during the auto-configuration process. In certain scenarios, communication attempts between the control module 116 and the configuration module 118 could even potentially timeout, for example, due to the control chip spending its time reporting touch locations rather than promptly responding to a control command. If sufficiently disruptive touch activity is detected during the auto-configuration process, the configuration module 118 may trigger a re-start of the process or part of the process in some embodiments.

In the methods 300 to 500 of FIGS. 3 to 5, the controller 104 may automatically determine size and/or other characteristics of the touch panel to which it is connected (e.g. upon start-up), and the controller 104 may be automatically configured for operation with the touch panel. These methods may not require touches or other user input. In some embodiments, however, user input such as touches on the touch panel may be used for configuration of the touch panel. Automatic detection of touch panel characteristics and configuration of the controller 104 for the same may save time for technicians or other users setting up the touch sensor system. The controller 104 may allow a variety of different touch panels to be plugged in to the controller 104 and used right away without the user or technician needing to configure the controller 104 for different sizes or other settings such as sensitivity.

In some scenarios, users of a touch panel may wear gloves, add a protective cover layer over the touch panel top layer, or take other actions that change the properties of the touch panel or touches thereon relative to the default condition of the touch panel and/or touches from bare fingers. Users might also install a thinner top layer glass to perhaps maximize touch panel sensitivity to help achieve sufficient sensitivity that the system works with thick gloves. Such changes may alter the sensitivity setting that provide sufficient or optimal touch detection and/or accuracy. In such cases, the touch panel response and signal outputs therefrom may not match the known properties saved in a database. In other scenarios, a touch panel not yet cataloged in a database of known signal characteristics may be used with the controller 104. Thus, it may be desirable for the sensitivity of the controller 104 to be configurable for use with the touch panel. Furthermore, orientation of a touch panel connected to the controller 104 may be ambiguous or not known to the controller 104 when the touch panel is connected or installed.

Figure 6:
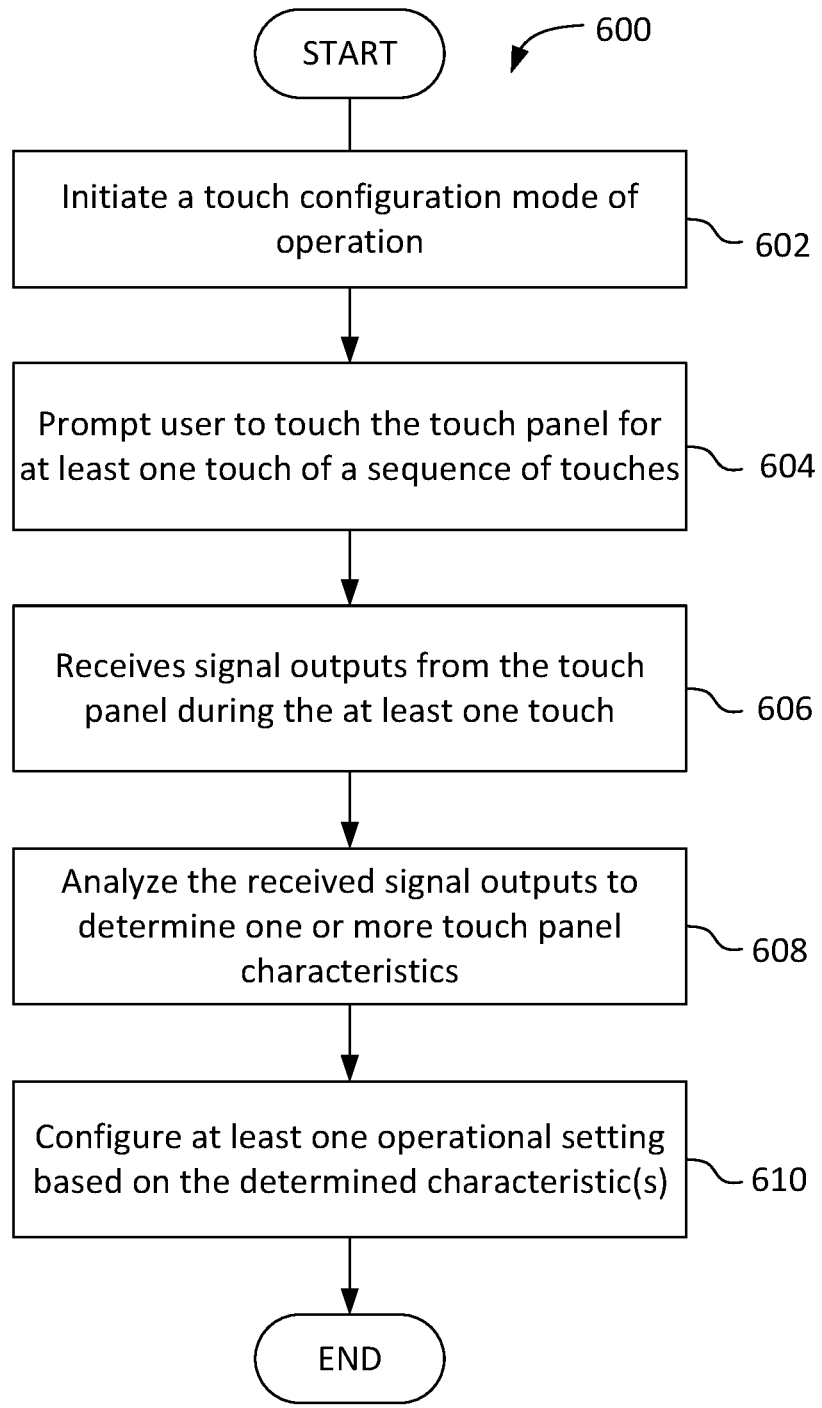
FIG. 6 is a flowchart of another example method for configuring a controller for a touch panel according to some embodiments.

FIG. 6 is a flow chart of another touch sensor system configuration method 600 that may be used as an alternative to (or together with) the method 500 of FIG. 5. The method 600 may, for example, be implemented by the configuration module 118. However, embodiments are not limited to the controller 104 of FIG. 1 or 2.

At block 602, the controller 104 initiates a touch calibration mode of operation. In the touch calibration mode of operation, the controller 104 obtains a series of touches from a user. This touch calibration mode of operation may be initiated upon a variety of trigger conditions. The trigger condition may be, for example, upon startup, after determining a size of the touch panel, upon receipt of user input (e.g., via a button), or other trigger conditions. Initiating this mode of operation may include providing an indication (e.g., visual or audio cue) to the user that the mode of operation has started.

At block 604, the user is prompted to touch the touch panel for at least one touch of a sequence of touches. This may include prompting an entire sequence of touches, or a first touch in the sequence. The first touch will be the first touch in a designated sequence of touches. The prompting may, without limitation, comprise activating one or more visual cues such as lights, audio cues, or the like. The user may be prompted to touch multiple regions on the touch panel in a sequence. For example, the user may be instructed to touch each of four quadrants (or three of the quadrants) in a sequence. More details of example touch sequences are discussed below.

At block 606, the controller 104 receives signal outputs from the touch panel during the touch(es) thus prompted. The controller 104 may also provide cues for when each touch has been held for a sufficient duration. For example, each touch may be held briefly, and the controller 104 may then activate a light on the controller 104 or elsewhere on the touch device to indicate that the touch may be released. Another cue may prompt the next touch of the sequence.

At block 608, the controller 104 analyzes the received signal outputs. The analysis may comprise determining one or more touch panel characteristics. The control module 116 may generate data (or "touch data") based on the received signals, and the configuration module 118 may analyze the data. The touch data may include determined touch locations and other information such as measurements of signal levels for cell of the touch panel. The touch panel characteristics determined from this touch information may include orientation of the touch panel, interference levels, or an average signal strength from the touch panel.

Blocks 604 to 608 may be repeated until the sequence is complete. For each iteration, a single touch in a sequence may be prompted at block 604, signal outputs for that touch received at block 606, and those signal outputs analyzed at block 608. The process then repeats for each remaining touch in the sequence. The prompt (e.g., visual cue) may indicate progression or current stage of the sequence, as discussed below. For example, the configuration module 118 of the controller 104 may: cause the controller 104 to prompt a user for a first touch; analyze the resulting touch data generated by the control module 116 that received signal outputs from the touch panel; configure an operation setting; and repeat the process for remaining touches of the sequence. A user may also be prompted, to stop the current touch when the current touch has been detected or held for a sufficient duration. A user may optionally be prompted to not touch the touch panel again until the next touch in the sequence is prompted. These prompts may also comprise visual or audio cues.

At block 610, at least one operation setting of the controller 104 is configured as a function of the results of the analysis step at block 608. Where one or more additional touch panel characteristics are determined, the configurating may be based on the determined touch panel characteristic(s). If the determined characteristic is orientation of the touch panel, the controller 104 may be configured to operate with that orientation. In some embodiments, a sensitivity setting of the controller 104 may be configured based on the analysis of the signal outputs from the touch panel. For example, the analysis may determine that sensitivity is too high or too low. Block 610 may also be performed after each iteration of blocks 604 to 608, such that the at least one operation setting is set and refined as the process continues.

The goals of the sequence of touches may include: a) allowing the controller 104 to choose an optimal or adequate sensitivity setting to use for the touch panel, b) allowing the controller 104 to choose an optimal or adequate threshold signal level above which a touch is registered; and c) determining a touch panel orientation. Since the sensitivity and threshold signal levels for registering touch will be based on actual user touches, this method may help provide better real-world settings for the touch sensor system operation. The automatic size detection methods described herein combined with the method 600 of FIG. 6 may allow the controller 104 to quickly work optimally with a very wide range of PCAP touch panels, including those not previously known to the controller 104.

Sequential touches in upper, lower, left and right regions of the touch panel (from the user's perspective) may allow the controller 104 to determine the orientation of the touch panel from the user's point of view to allow proper orientation of subsequently reported of touch coordinates. The user may be prompted to touch different quadrants or regions of the touch panel for the sequence. For example, the user may be prompted to touch "left", "right", "lower" and/or "upper" regions and/or corners, the controller 104 may determine the orientation of the touch panel. This method of orientation determination is distinct from "location calibration", which typically isn't needed for PCAP touch panels. In a "location calibration" a user is typically asked to accurately touch specific, precise points on the touch panel. In contrast, the region or quadrant touches according to the present method may be made anywhere in the region, and touches need not be tied to specific points within those regions.

Before, during and after the sequential touch process the controller 104 may manage the touch panel's sensitivity level. Sensitivity may be adjusted prior to each new touch (and after the last touch) to optimally set the touch panel sensitivity level for subsequent use (whether that subsequent use is normal operation or receipt of the next touch in the sequence). The sensitivity setting may even be further refined while the controller 104 is attempting/waiting to accept a valid touch during the sequential sequence if it becomes apparent from the pattern of received signal outputs from the touch panel that false touches are being received due to a sensitivity setting that is too high. The adjustments made at the end of the sequential touch process also include calculation/selection of an optimal touch threshold (the mutual capacitance touch signal level above which a touch gets triggered and reported).

A user may be instructed (e.g., in an instruction manual) to make touches in a sequential process in a way that represents subsequent real-world normal use. For example, if in subsequent normal use, users will be wearing gloves or the touch panel will be mounted behind a thick glass top layer, then the user may be instructed to replicate these conditions during the sequential touch process so that the controller 104 can choose a sensitivity setting and touch threshold to accept touches that achieves both reliable touch detection and a signal-to-noise ratio that avoids false touches due to interference.

Before a first touch of the sequential touch process, the controller 104 may set the sensitivity as high as possible, or "maximum sensitivity" setting (possibly within a maximum interference constraint so the touch panel isn't overwhelmed by interference). This "maximum sensitivity" may give the best possible chance of detecting a very weak touch (e.g., due to very thick top layer glass, thick gloves, etc.). During the touch sequence, the controller 104 may examine received touch panel signal outputs to distinguish potential false touches from real touches. During this touch sequence, regular touch panel responsiveness (i.e. short touch-to-response time) may not be required, so the controller 104 may take the opportunity to monitor the touch panel signal outputs for patterns that indicate excess sensitivity (for the level of interference affecting the touch panel) and may make ongoing refinements to sensitivity while monitoring (over what would be an excessive amount of time during normal use) for a pattern of cell signals characteristic of a convincing and enduring touch.

Prior to receiving a first touch (prior to first occurrence of block 604), the controller 104 may analyze signal outputs from the touch panel to generate pre-touch data, as these pre-touch signal outputs may be indicative of interference. After the first touch is detected, the controller 104 may compare the touch data for the first touch and the pre-touch data and set the touch panel sensitivity as a function of the comparison. This comparison may be used to determine an optimal or adequate sensitivity level to yield sufficiently reliable touch detection and avoidance of false touches due to interference. As more information about more touches and/or interference is collected through progress through the touch sequence, the controller 104 may refine touch panel sensitivity and/or touch threshold settings based on the additional information.

An example touch sequence for the method 600 of FIG. 6 may comprise four touches: 1) upper left, 2) upper right, 3) lower right and 4) lower left (in any order). Orientation may be determined with less than four touches, but additional touches may provide more datapoints for determining a more accurate or optimal sensitivity setting. The four-point process may also be more intuitive for users (e.g., technicians).

The controller 104 may optionally provide a visual cue corresponding to the place in the sequence (one, two, three or four) for each touch of the sequence. The visual cue could be a number of flashes of an LED on the controller 104, but any suitable method to communicate such information to the user may be implemented. As a non-limiting example of a specific touch sequence, the user may be prompted to make and hold a sequence of four touches in each of four quadrants of the touch panel. First, the user may be prompted to touch the top-left quadrant by illuminating an LED on the controller 104 switching on. The LED may also flash a single time to indicate the first touch is being taken. Upon acceptance of the touch information, the controller 104 may signal successful receipt of the first touch by switching off the LED. Once the controller 104 has briefly analyzed the resulting touch data and made adjustments (e.g., by comparing to pre-touch signal levels and adjusting sensitivity), the LED is switched on again to prompt the user to touch and hold the next (upper-right) quadrant. Optionally, the LED may flash twice to remind the user of their place in the sequence. Again, once the controller 104 receives the touch signals over the sufficient duration, the LED is switched off, calculations are done to choose/refine sensitivity, new sensitivity setting is applied. This process repeats until the four touches in each of the four quadrants is complete and subsequent analysis and setting updates are complete.

During the touch calibration mode of operation, or at least when touches have been prompted, controller 104 may repeatedly monitor all the signal output levels for all cells, searching for a sustained single set of elevated cells (which may be a reasonable size of contiguous cells for a touch). When the elevated levels are observed for sufficient number of samples, the touch may be considered "confirmed." When touch has been confirmed, the controller 104 may perform averaging of the elevated cells (possibly for each of a set of samples) to identify the level of this touch signal. The controller 104 may take note of the quadrant of the touch panel of this touch. The quadrant may be used in determining touch panel orientation and directions of Tx (transmit) and Rx (receive) line wiring when the sequence is complete. The controller 104 may also note the current sensitivity setting during each touch. The signal levels of the touches in each quadrant, combined with the sensitivity settings that were applied for the touches in the quadrants, can be used to iterate between each touch towards better sensitivity setting and touch threshold choices. The sensitivity setting may be iterated between touches in the sequence and after the sequence is complete. The iteration after the sequence is complete may be used for normal operation of the touch panel.

Optionally, blocks 602 and 604 of the method of FIG. 6 may be omitted. The controller 104 may instead analyze signal outputs during touches in normal operation, and sensitivity characteristics may be determined (e.g., from signal strengths) and the controller 104 may be configured accordingly. The method may be performed without prompting a particular sequence of touches. It may not be necessary to obtain touches in particular regions or quadrants if orientation is known or otherwise not required to be determined.

The controller 104 may support single touch (1-touch) and/or various levels of multiple concurrent touch ("multitouch") detection. Some users may prefer support for 10-touches, others for 2-touches, etc. Two-touch detection may enable some gesture controls such as pinch zoom and rotate functions. Two-touch may, for example, allow inadvertent additional touches during a two-touch gesture without disturbing the two-touch gesture.

The control module 116 may also be configured as to whether touches are activated on touch panel contact or removal of contact. Although touch activation on contact removal has become broadly accepted in user's lives, there may be applications where action or feedback (such as display response or triggering some other action) is desired more quickly, so the onset of contact activates the touch rather than the subsequent removal of contact.

The control module 116 in FIGS. 1 and 2 may be implemented by various hardware, software, and combinations thereof. The control module 116 may comprise circuitry having analog components that drive and receive analog signal outputs from the touch panel (e.g. touch panel 102 or 202). This control module 116 may include a processor and a communication interface (e.g. USB interface). The configuration module 118 may also be implemented by various hardware, software, and combinations thereof. The configuration module 118 may comprise an additional processor that performs the size adaption functions. In other embodiments, the control module 116 and the configuration module 118 may by implemented using the same processor.

A typical controller for use with a capacitive touch panel may comprises an electronic board with one control chip (such as a PCAP control chip), although some controllers may have more than one control chip (e.g. for very large touch panels). The control chip typically has a communication interface to interact with a host computer, mainly to report touch locations. In some controllers, this interface may also accept configuration commands (and reports the control chip's configuration) so that details of how the control chip operates can be set (and verified). In some embodiments, a first interface could be used to report touch locations, while a second interface could be used for providing configuration data and/or accepting configuration commands. One common interface type for communication between a controller and a host computer is a Universal Serial Bus (USB) USB connection. Controllers may also support RS-232 and I2C (Inter-Integrated Circuit or I2C) and CANBUS (Controller Area Network bus), or more than one interface option, to name a few examples. The USB interface on a chip may utilize features within the USB standard to have two different types of communication with a host computer (e.g. one to report touch locations and another to manage configuration).

A control chip in a controller may, thus, function as a USB 'device' and a user's host computer functions as USB 'host'. In I2C terminology, the control chip may be the 'slave' and the host computer may be the 'master'.

Figure 7:
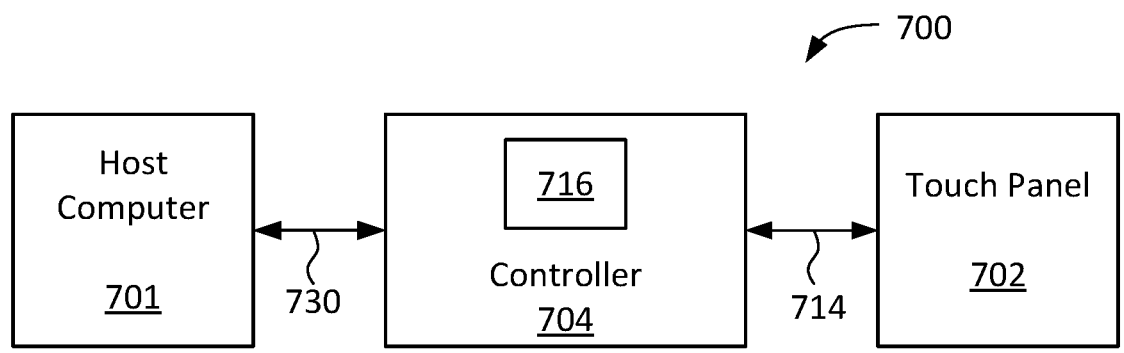
FIG. 7 is a block diagram of an example system, including a touch sensor system coupled to a host computer.

FIG. 7 shows one example system 700 in which a controller 704 is coupled to touch panel 702 and a host computer 701. In this example, the controller 704 includes a control chip 716. The control chip 716 in this example may include a control module 118, similar to the control module 116 of FIGS. 1 and 2, and a configuration module, similar to the configuration module 118 of FIGS. 1 and 2. The host computer 701 is coupled to the controller 704 via USB interface 730 (although embodiments are not limited to USB interfaces). The controller 704 is coupled to the touch panel 702 by bus 714. The host computer 701 functions as a USB 'host' to the control chip 716, which functions as a USB 'device' to the host computer 701. The controller 704 may perform the methods of FIGS. 3 to 6.

Figure 8:
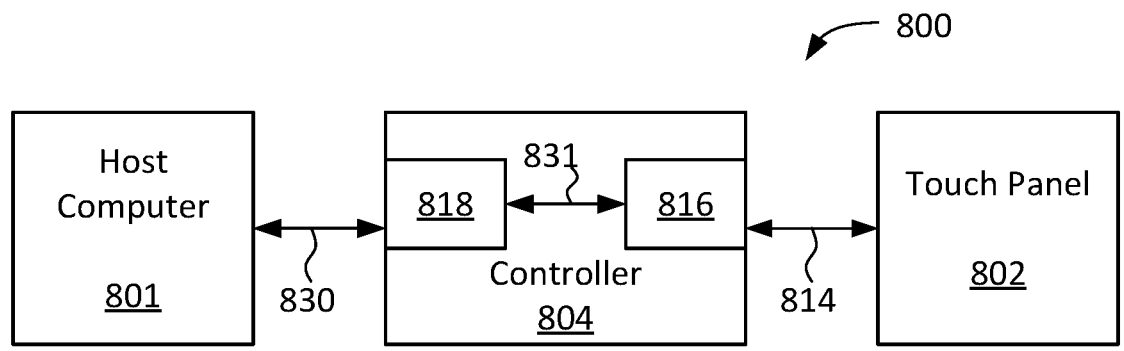
FIG. 8 is a block diagram of another example system, including a touch sensor system coupled to a host computer.

FIG. 8 shows another example system 800 in which a controller 804 for a touch sensor system is coupled to touch panel 802 and a host computer 801. The controller 804 is coupled to the touch panel 802 by bus 814. In this example, the controller 804 includes a control chip 816 and configuration chip 818. The control chip 816 may implement the control module 116 of FIGS. 1 and 2. The configuration chip 818 may implement the configuration module 118 of FIGS. 1 and 2. The configuration chip 818 is one example implementation of the configuration module, but any other similarly functioning circuitry or hardware may be used in other embodiments. The host computer 801 is coupled to the configuration chip 818 via a first USB interface 830, and the configuration chip 818 is coupled to the control chip 816 via a second USB interface 831. The host computer 801 functions as a USB 'host' to the configuration chip 818, which functions as a USB 'device' to the host computer 801. The configuration chip 818 acts as USB 'host' to the onboard control chip 816. The control chip 816 behaves as a USB 'device' to the configuration chip 818. The configuration chip 818 may relay touch sensor data from the control chip 816 to the host computer 801. From the perspective of the host computer 801 and a user, the touch panel 802 functions as would be expected with a direct USB connection to the control chip 816. However, the host computer 801, as USB host, will communicate directly with the configuration chip 818 as USB device, rather than the control chip 816. Thus, the host computer 801 may thereby be at least partially insulated or isolated from direct communication with the control chip 816 with the configuration chip 818 as an intermediary.

Since control chips for touch panels, such as control chip 816, may be produced by third party providers, there may be security concerns for devices that include unproven or untrusted control chips. That is, for sensitive applications, there may be a concern that a third-party control chip could include nefarious functionality that could compromise the host computer, or another external system connected to the host computer. With reference to FIG. 8, the configuration chip 818 may be configured to function as a firewall between the control chip 816 and the host computer 801. The configuration chip 818 being separate from the control chip 816 may, thus, allow for an extra level of security to be added, thereby reducing risk for the host computer. The host computer 801 will only communicate directly with the configuration chip 818.

The firewall may block nefarious USB communication that is attempted under the guise of any other type of USB device. For example, the firewall may be configured to block all attempts by a nefarious USB touch control chip to attempt to behave as a keyboard, so unwanted activity that can be performed with keystrokes such as host computer register editing and program running may become impossible. Any USB devices supported by the USB standard and all their associated forms of communication may become unavailable to nefarious USB touch control chip that is blocked by the firewall. Further, the touch-sensor-system-specific USB firewall may also address the fact that that any USB device, even a USB touch sensor system, can enumerate (set up USB communications with its USB host) with many different kinds of interfaces (for example to exchange vendor-specific data). A nefarious USB touch panel control chip could attempt damaging behaviour through these means, for example, attempting to read longer data strings than it agreed with the host during enumeration to elicit host computer memory contents. Many computer systems do not protect themselves against such requests and provide information that at the very least can serve to identify the type of host computer, so informing the nefarious device how to most effectively proceed with further attacks. A nefarious USB touch chip could also attempt to write longer data strings than agreed during USB enumeration and potentially alter and damage host computer operation. Even a USB device that acts only as a USB touch panel with only a single USB touch panel communication interface still has access to basic USB functionality such as requesting host manufacturer name, host device name and a handful of other data strings from the host. These facilities could be abused, again (for example) by requests for more data than agreed during enumeration. The USB firewall provided by the configuration chip 818 may prevent abuse of even these limited capabilities. For example, messages from a nefarious control chip may be answered by the USB firewall of the configuration chip 818 and never sent to the customers computer.

Since the system described herein may be specific to touch panel applications, the firewall provided by the configuration chip 818 (or other similar circuitry) may block all direct communication between a suspect touch control chip and the host computer. The suspect control chip may enumerate with the USB host provided by the configuration chip 818. Then, during normal operation, the only USB communication to the host computer is touch coordinates conveyed through the firewall. The host computer USB host interface only enumerates the firewall USB device (i.e. configuration chip 818).

The touch panel specific USB firewall may be configured to offer some protection against simulated touches generated within the nefarious USB touch control chip to hack information or cause host computer damage. For example, a USB firewall targeted to protect against a potentially nefarious touch control chip can detect and choose to block touch data based on one or more suspicious characteristics of the touch data being detected. Such suspicious characteristics may include (but are not limited to): suspiciously evenly spaced, in time, touches; unrealistically closely-spaced, in time, touches; touch durations being precisely consistent or having a predictable pattern; a same or similar touch pattern has been detected in the past when evidence suggests an authorized operator was not present; the same or similar pattern has been detected overly frequently; the touch pattern and timing matching previously detected pattern too precisely and/or unrealistically consistent or precisely positioned 'touches'. Such characteristics and others may indicate that the touch data is simulated rather than genuine.

In some embodiments, the firewall function may be implemented by circuitry intermediate the host computer and the control chip without the automatic characterization and configuration features of the configuration module described above. The circuitry interfacing with the host computer may function as a firewall without implementing the methods of FIGS. 3 to 6, for example.

Figure 9:
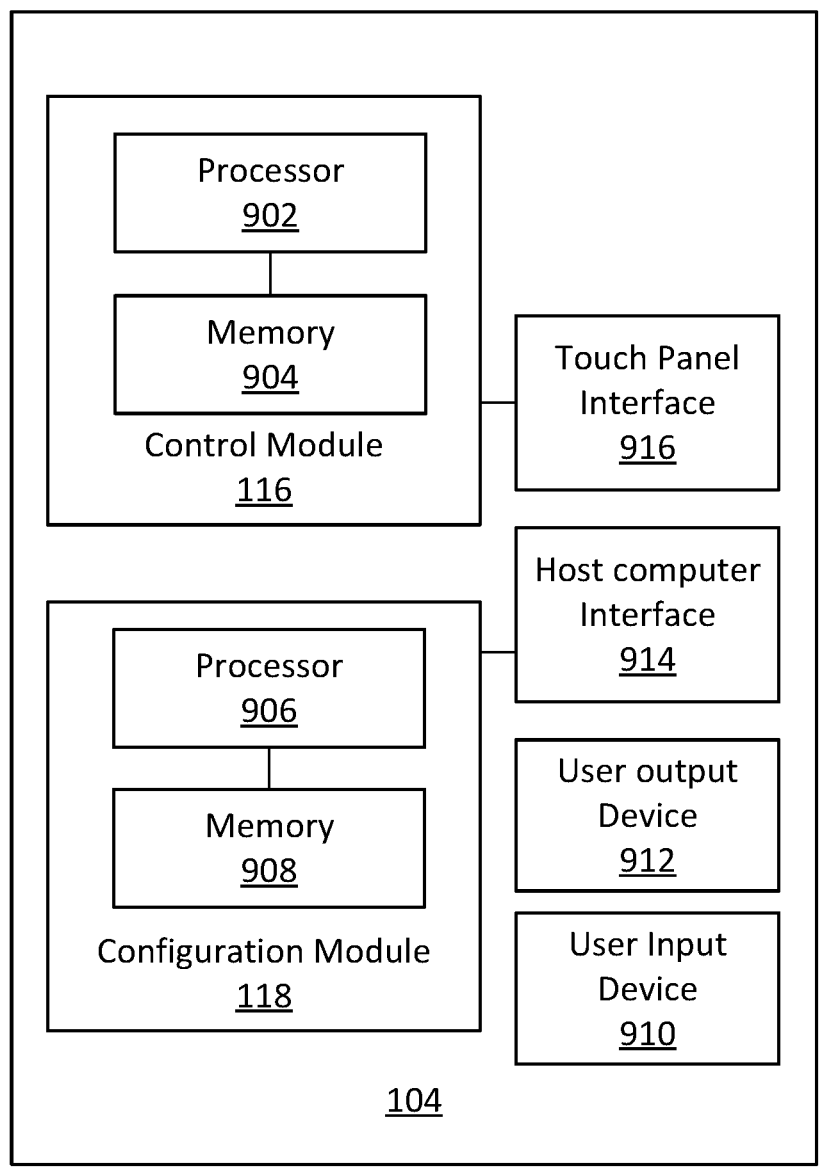
FIG. 9 is a block diagram of the controller of FIGS. 1 and 2, according to some embodiments.

FIG. 9 is a block diagram showing an example hardware implementation of the controller 104 of FIGS. 1 and 2. The controller 804 of FIG. 8 may have a similar implementation. However, embodiments are not limited to the specific controller 104 shown, and the methods and principles described herein may be used with other controllers.

As shown, the controller 104 includes the control module 116 and the configuration module 118. The control module 116 is in the form of a PCAP control chip in this embodiment, including a processor 902 and memory 904. The processor 902 may execute instructions stored on the memory 904 for performing PCAP control chip functions, including driving transmit line(s) 204 (shown in FIG. 2) and receiving signal outputs from the touch panel on receive lines 206 (shown in FIG. 2).

The configuration module also includes a processor 906 and memory 908. The processor 906 may execute instructions stored on the memory 908. The instructions stored on the memory 908 may cause the processor 906 to implement the methods of any of FIGS. 3 to 6, for example. Other functions described herein for characterizing a touch panel and configuring the controller 104 may also be implemented by the processor 906. In other embodiments, the control module 116 and/or configuration module 118 may share one or more processors or memories rather than being separate as shown in FIG. 9.

The controller 104 also includes a user input device 910 and a user output device 912. The user input device 910 may comprise one or more buttons or any other suitable device for receiving user input. The user output device 912 may comprise a visual output device, such as one or more LEDs, or any other suitable device for providing visual, audio or other output to a user.

The controller 104 further includes a host computer interface 914 and a touch panel interface 916. The host computer interface 914 is coupled to the configuration module 118 and may enable communication with a host computer. The host computer interface 914 may, for example, comprise a USB interface coupled to the configuration module 118, so that the host computer communicates with the controller 104 via the configuration module 118 (e.g. configuration chip) rather than directly with the control module 116.

The touch panel interface 916 is coupled to the control module 116. The touch panel interface may be any interface for connecting transmit and receive lines of the control module 116 to a bus (such as bus 114 in FIGS. 1 and 2) to a touch panel. The touch panel interface 916 may include a flex tail connection port, for example, which is connected to each of the transmit and receive lines (see transmit lines 204 and receive lines 206 in FIG. 2).

It is to be understood that a combination of more than one of the approaches described above may be implemented. Embodiments are not limited to any particular one or more of the approaches, methods or apparatuses disclosed herein. One skilled in the art will appreciate that variations, alterations of the embodiments described herein may be made in various implementations without departing from the scope of the claims.

We claim:

1. A method for configuring a touch sensor controller operatively coupled to a touch panel, the touch panel comprising a plurality of transmit electrodes and a plurality of receive electrodes, the method comprising:
   sending, by configuration circuitry of the touch sensor controller, signaling to control circuitry of the touch sensor controller to cause the control circuitry to: selectively and individually drive at least one of the transmit electrodes, and for each driven transmit electrode, receive signal outputs from one or more of the receive electrodes while the transmit electrode is driven, wherein the transmit electrodes and the receive electrodes are arranged in a sensing area of the touch panel;
   determining, by the configuration circuitry, one or more characteristics of the touch panel as a function of the signal outputs from the receive electrodes, wherein the one or more characteristics of the touch panel comprises a number of transmit electrodes and a number of receive electrodes of the touch panel; and configuring at least one operation setting of the touch sensor controller based on the one or more characteristics of the touch panel.

2. The method of claim 1, further comprising measuring signal levels of the signal outputs, wherein the determining the one or more characteristics as a function of the signal outputs comprises determining one or more characteristics of the touch panel as a function of the measured signal levels.

3. The method of claim 1, wherein the touch sensor controller comprises a plurality of transmit lines and a plurality of receive lines, each transmit electrode being coupled to a respective one of the transmit lines, and each receive electrode being coupled to a respective one of the receive lines, and wherein the signaling from the configuration circuitry causes the control circuity to sequentially drive at least one of the plurality of transmit lines.

4. The method of claim 1, wherein the plurality of transmit electrodes is arranged as one of rows and columns, and the plurality of receive electrodes is arranged as the other of rows and columns.

5. The method of claim 1, wherein the configuring the at least one operation setting comprises configuring the touch sensor controller for operation with the determined number of the transmit electrodes and the determined number of the receive electrodes.

6. The method of claim 1, wherein the one or more characteristics of the touch panel comprises a touch panel type.

7. The method of claim 1, wherein the at least one operation setting comprises a sensitivity setting.

8. The method of claim 1, further comprising:
determining one or more additional characteristics of the touch sensor as a function of the received signal outputs; and
configuring an additional operation setting based on the determined one or more additional characteristics.

9. The method of claim 1, further comprising:
analyzing the received signal outputs and adjusting a sensitivity setting as a function of the analyzing.

10. A configuration module for a touch sensor controller operative coupled to a touch panel, the touch panel comprising a plurality of transmit electrodes and a plurality of receive electrodes arranged in a sensing area of the touch panel, the configuration module comprising:
configuration circuitry configured to perform steps including:
sending signaling to control circuitry of the touch sensor controller to cause the control circuitry to:
selectively and individually drive at least one of the transmit electrodes, and for each driven transmit electrode, receive signal outputs from one or more of the receive electrodes while the transmit electrode is driven, wherein the transmit electrodes and the receive electrodes are arranged in a sensing area of the touch panel;
determining one or more characteristics of the touch panel as a function of the signal outputs from the receive electrodes, wherein the one or more characteristics of the touch panel comprises a number of transmit electrodes and a number of receive electrodes of the touch panel; and
configuring at least one operation setting of the touch sensor controller based on the one or more characteristics of the touch panel.

11. The configuration module of claim 10, wherein the configuration circuitry is further configured to measure signal levels of the signal outputs, wherein the determining the one or more characteristics as a function of the signal outputs comprises determining one or more characteristics of the touch panel as a function of the measured signal levels.

12. The configuration module of claim 10, wherein the touch sensor controller comprises a plurality of transmit lines and a plurality of receive lines, each transmit electrode being coupled to a respective one of the transmit lines, and each receive electrode being coupled to a respective one of the receive lines, and wherein the signaling from the configuration circuitry causes the control circuity to sequentially drive at least one of the plurality of transmit lines.

13. The configuration module of claim 10, wherein
the plurality of transmit electrodes is arranged as one of rows and columns, and the plurality of receive electrodes is arranged as the other of rows and columns, and configuring the at least one operation setting comprises configuring the touch sensor controller for operation with the determined number of the transmit electrodes and the determined number of the receive electrodes.

14. The configuration module of claim 10, wherein the one or more characteristics of the touch panel further comprises a sensitivity characteristic.

15. The configuration module of claim 10, further comprising a first hardware interface for communication with a host computer, and a second hardware interface for communication with the control circuitry.

16. The configuration module of claim 15, wherein the first hardware interface comprises a first USB interface.

17. The configuration module of claim 15, wherein the second hardware interface comprises a second USB interface.

18. A touch sensor controller comprising touch sensor control circuitry and the configuration module of claim 10.

* * * * *